(12) United States Patent
Fritz et al.

(10) Patent No.: US 9,135,512 B2
(45) Date of Patent: Sep. 15, 2015

(54) FIDUCIAL MARKS ON SCANNED IMAGE OF DOCUMENT

(75) Inventors: Terry M. Fritz, Mossyrock, WA (US); Jon Karl Lewis, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 359 days.

(21) Appl. No.: 13/098,454

(22) Filed: Apr. 30, 2011

(65) Prior Publication Data

US 2012/0275708 A1     Nov. 1, 2012

(51) Int. Cl.
| | |
|---|---|
| *G06K 9/46* | (2006.01) |
| *G06K 9/00* | (2006.01) |
| *G06K 9/60* | (2006.01) |
| *G06K 9/62* | (2006.01) |
| *G06K 9/32* | (2006.01) |
| *G06K 9/20* | (2006.01) |

(52) U.S. Cl.
CPC .......... *G06K 9/2063* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 4,893,333 A * | 1/1990 | Baran et al. ............. | 379/100.11 |
| 5,418,865 A | 5/1995 | Bloomberg | |
| 5,867,633 A | 2/1999 | Taylor, III et al. | |
| 6,278,483 B1 | 8/2001 | Sartor | |
| 6,357,658 B1 * | 3/2002 | Garczynski et al. ..... | 235/462.01 |
| 6,535,298 B2 | 3/2003 | Winter et al. | |
| 6,742,708 B2 | 6/2004 | Shaked et al. | |
| 6,744,529 B2 | 6/2004 | Winter et al. | |
| 6,798,925 B1 | 9/2004 | Wagman | |
| 6,909,805 B2 | 6/2005 | Ma et al. | |
| 6,950,982 B1 | 9/2005 | Dourish | |
| 6,952,803 B1 | 10/2005 | Bloomberg et al. | |
| 6,956,671 B2 | 10/2005 | Monty et al. | |
| 7,142,318 B2 | 11/2006 | Lopez et al. | |
| 7,181,089 B2 | 2/2007 | Esaki et al. | |
| 7,202,861 B2 | 4/2007 | Lynggaard | |
| 7,233,913 B2 | 6/2007 | Scroggie et al. | |
| 7,293,697 B2 | 11/2007 | Wiebe et al. | |
| 7,313,340 B2 * | 12/2007 | Savitzky et al. ................ | 399/84 |
| 7,315,391 B2 | 1/2008 | Nakano et al. | |
| 7,489,415 B2 | 2/2009 | Furuta et al. | |

(Continued)

FOREIGN PATENT DOCUMENTS

| | | |
|---|---|---|
| EP | 1404102 A1 | 9/2002 |
| GB | 2410823 B | 8/2007 |

(Continued)

OTHER PUBLICATIONS

CouponTrunk web site, http://www.coupontrunk.com, dated Feb. 24, 2012.

(Continued)

*Primary Examiner* — Sumati Lefkowitz
*Assistant Examiner* — Ryan P Potts
(74) *Attorney, Agent, or Firm* — Michael A. Dryja (57) ABSTRACT

A scanned image of a document includes a pair of fiducial marks, and a code mark between and at least substantially collinear with the pair of fiducial marks. A location of a feature within the scanned image of the document, other than the pair of fiducial marks and the code mark, is determined based on the pair of fiducial marks and the code mark within the scanned image.

17 Claims, 6 Drawing Sheets

(56) References Cited

U.S. PATENT DOCUMENTS

| | | | |
|---|---|---|---|
| 7,525,675 B2 | 4/2009 | Shelton et al. | |
| 7,561,289 B2 | 7/2009 | Talley et al. | |
| 7,573,598 B2 | 8/2009 | Cragun et al. | |
| 7,650,568 B2 | 1/2010 | Williamson et al. | |
| 7,878,617 B2 | 2/2011 | Mizes et al. | |
| 8,049,910 B2 | 11/2011 | Beckman et al. | |
| 8,115,948 B2 | 2/2012 | Rosenfeld et al. | |
| 8,228,527 B2 | 7/2012 | Winter et al. | |
| 8,233,751 B2 | 7/2012 | Patel et al. | |
| 8,346,023 B2 | 1/2013 | Lin | |
| 2001/0010730 A1* | 8/2001 | Rhoads | 382/100 |
| 2001/0019416 A1 | 9/2001 | Monty et al. | |
| 2001/0040685 A1 | 11/2001 | Winter et al. | |
| 2002/0033965 A1 | 3/2002 | Winter et al. | |
| 2002/0051201 A1 | 5/2002 | Winter et al. | |
| 2002/0138476 A1 | 9/2002 | Suwa et al. | |
| 2002/0186404 A1 | 12/2002 | Gragg | |
| 2003/0020945 A1 | 1/2003 | Lopez et al. | |
| 2003/0167203 A1 | 9/2003 | Thorne et al. | |
| 2003/0180703 A1* | 9/2003 | Yates et al. | 434/353 |
| 2004/0047001 A1 | 3/2004 | Gehring et al. | |
| 2004/0145770 A1 | 7/2004 | Nakano et al. | |
| 2004/0150845 A1 | 8/2004 | Brouhon | |
| 2004/0151399 A1 | 8/2004 | Skurdal et al. | |
| 2004/0205538 A1 | 10/2004 | Banerjee et al. | |
| 2005/0071738 A1 | 3/2005 | Park et al. | |
| 2005/0185204 A1 | 8/2005 | Shelton et al. | |
| 2005/0195447 A1 | 9/2005 | Os | |
| 2005/0231746 A1 | 10/2005 | Parry et al. | |
| 2006/0218496 A1 | 9/2006 | Kunori | |
| 2006/0224950 A1 | 10/2006 | Takaai | |
| 2006/0229940 A1 | 10/2006 | Grossman | |
| 2006/0294450 A1 | 12/2006 | Barrus et al. | |
| 2007/0013968 A1* | 1/2007 | Ebaugh et al. | 358/448 |
| 2007/0147680 A1 | 6/2007 | Lundberg | |
| 2007/0188793 A1 | 8/2007 | Wakai | |
| 2008/0018591 A1 | 1/2008 | Pittel et al. | |
| 2008/0273797 A1 | 11/2008 | Takikawa et al. | |
| 2008/0309988 A1 | 12/2008 | Johnson et al. | |
| 2009/0128865 A1 | 5/2009 | Kuchibhotla et al. | |
| 2009/0232398 A1 | 9/2009 | Martin et al. | |
| 2009/0251338 A1 | 10/2009 | Marggraff et al. | |
| 2010/0027896 A1 | 2/2010 | Geva et al. | |
| 2010/0057573 A1 | 3/2010 | Singhal | |
| 2010/0182631 A1 | 7/2010 | King et al. | |
| 2010/0309527 A1 | 12/2010 | Mandalapu et al. | |
| 2010/0318407 A1 | 12/2010 | Leff et al. | |
| 2011/0080608 A1 | 4/2011 | Do et al. | |
| 2011/0235128 A1 | 9/2011 | Sisco | |
| 2011/0276383 A1 | 11/2011 | Heiser, II et al. | |
| 2012/0026081 A1 | 2/2012 | Kompalli et al. | |
| 2012/0050790 A1 | 3/2012 | Hong | |
| 2012/0050818 A1 | 3/2012 | Watanabe | |
| 2012/0079409 A1 | 3/2012 | Luo et al. | |
| 2012/0266219 A1 | 10/2012 | Coleman et al. | |
| 2012/0275708 A1 | 11/2012 | Fritz et al. | |
| 2013/0226700 A1 | 8/2013 | Lewis | |
| 2013/0290326 A1 | 10/2013 | Lebedev | |

FOREIGN PATENT DOCUMENTS

| | | | |
|---|---|---|---|
| GB | 2410823 B | | 8/2007 |
| JP | 2002305701 A | | 10/2002 |
| JP | 2002305701 A | | 10/2002 |
| JP | 2003162383 A | | 6/2003 |
| JP | 2003162383 A | | 6/2003 |
| JP | 2005236983 A | | 9/2005 |
| JP | 2005236983 A | | 9/2005 |
| JP | 2006001287 A | | 1/2006 |
| JP | 2006001287 A | | 5/2006 |
| WO | 2010140983 A1 | | 12/2010 |
| WO | WO-2010140983 | | 12/2010 |

OTHER PUBLICATIONS

Coupons.com, "Coupons.com Coupons—Free Coupons, Printable Coupons, Coupon Codes, Grocery Coupons," Mar. 30, 2011, <http://web.archive.org/web/20110330120225/http://coupons.com/>.

EMC, "EMC Captiva Cloud Toolkit Transforms Web-based Scanning; Achieves Strong Third-party Adoption," Jul. 26, 2012, <http://www.emc.com/about/news/press/2012/20120726-01.htm>.

Evernote Corp., "ritePen 3.0 Manual,"Apr. 7, 2010, <http://www.ritescript.com/Manuals/ritePenManual30.aspx#Macros>.

Microsoft Developer Network, "Clipboard Formats," Sep. 9, 2010, <http://web.archive.org/web/20100909220445/http://msdn.microsoft.com/en-us/library/ms649013(VS.85).aspx>.

Mint.Com, "Our Product," May 22, 2010, <http://web.archive.org/web/20100522215052/http:www.mint.com/product/>.

Nuance Communications, Inc., "Workflows—From Nuance," Mar. 18, 2011, <http://community.nuance.com/wikis/omnipage/workflows.aspx>.

Wikipedia, "Coupons.com," Feb 24, 2011, <http://en.wikipedia.org/w/index.php?title=Coupons.com&oldid=415636560>.

* cited by examiner

FIDUCIAL MARKS ON SCANNED IMAGE OF DOCUMENT

BACKGROUND

Many consumers are enamored with coupons. Coupons permit consumers to purchase, rent, or lease products and services more inexpensively than if the coupons were not used. From the standpoint of businesses that offer coupons, coupons permit the businesses to, among other things, entice consumers that may not otherwise try or even be aware of their offerings.

DETAILED DESCRIPTION

As noted in the background, both consumers and businesses have varying reasons why coupons are useful. Existing coupon-offering techniques include businesses paying for coupons to be printed in newspapers and magazines that consumers buy or to which consumers subscribe, or inserted into mailers that are sent to consumers. More recently, online coupons permit consumers to view the coupons online using a computing device like a computer or a smartphone. The consumers may then print the coupons using a printing device like a printer, so that they can redeem the coupons at businesses, or the consumers may simply show electronically displayed images of the coupons when visiting businesses.

Figure 1:
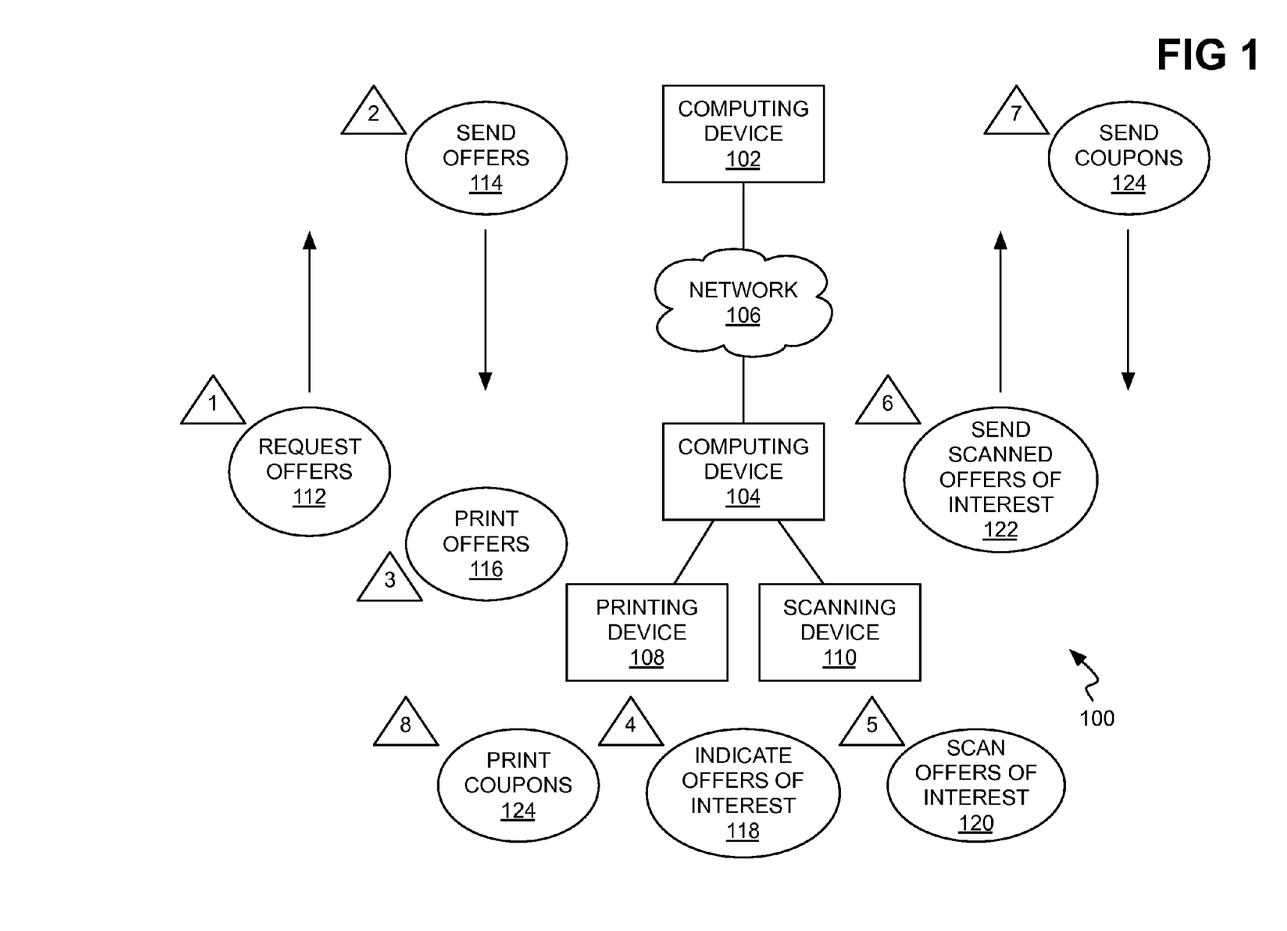
FIG. 1 is a diagram of an example couponing system.

In contrast to these existing coupon-offering techniques, FIG. 1 shows an example of a novel couponing system 100. The system 100 includes computing devices 102 and 104 that communicate with one another over a network 106. The computing device 102 may be a server computing device, for instance, which is operated by or for a business. The computing device 104 is a computing device that a user uses, and which can include a desktop or a laptop computer, and so on. The network 106 may be or include the Internet, an intranet, an extranet, a wireless network, a wired network, a telephony network, a local-area network, and/or a wide-area network, among other types of networks.

The computing device 104 is depicted in the example of FIG. 1 as being connected to a printing device 108 and a scanning device 110. The printing device 108 is a device that generates a hardcopy of an electronic version of a document, and can be or include an inkjet printer, a laser printer, and so on. A scanning device 110 is a device that generates a scanned image of a hardcopy of a document, which is more generally referred to as a scanned image of a document. The scanned image of a document is an electronic version of the document. The scanning device 110 can be or include a sheetfed scanner, a flatbed scanner, and so on.

The printing device 108 and the scanning device 110 are depicted as separate devices in the example of FIG. 1. However, as another example, the printing device 108 and the scanning device 110 may be integrated as or into a single device, which is commonly referred to as a multi-function device (MFD) or an all-in-one (AIO) device. Similarly, the computing device 104, the printing device 108, and the scanning device 110 are depicted as separate devices in the example of FIG. 1. However, as another example, the computing device 104 may be integrated with either or both of the printing device 108 and the scanning device 110. For instance, some printing devices and some MFDs have display screens and keyboards or other user input mechanisms that permit them to also perform the functionality of the computing device 104 as described herein.

The process that is generally performed within the system 100 is described in relation to parts 112, 114, 116, 118, 120, 122, 124, and 126, the order of performance of which is indicated by numbered triangles 1-8, respectively. A user at the computing device 104 requests offers from the computing device 102 (112), where the offers are to be realized via coupons. For instance, a user may be browsing a web site served by the computing device 102 over the network 106, using the computing device 104. The user may thus send a request from the computing device 104 to the computing device 102 for such offers, over the network 106.

In response, the computing device 102 sends offers to the computing device 104 over the network 106 (114). For instance, the offers may be in the form of an electronic version of the document that lists a number of offers in which the user may potentially have interest. At the computing device 104, the offers are printed by the printing device 108 (116). For instance, the electronic version of a document that lists a number of offers may be printed on a sheet of media to generate a hardcopy of this document.

The offers that are sent may be particular to the user, or otherwise custom-generated for the user. For instance, based on various known information regarding the user, offers that are likely to be of interest to the user may be sent to him or her. As an example, it may be known that a user owns a certain brand of inkjet printer, and that the user typically uses non-original equipment manufacturer (OEM) ink in this printer. As such, the offers may include the opportunity for the user to purchase discounted OEM ink for his or her printer. From the business's standpoint, it has an opportunity to demonstrate to the user that OEM ink is of better quality than non-OEM ink. From the user's standpoint, he or she has an opportunity to purchase ink at a discounted price.

The user indicates the offers for which he or she has an interest in receiving corresponding coupons (118). For instance, the hardcopy of the document may have features, such as empty circles, next to the listed offers. If a given offer is of interest to the user, he or she marks the feature, such as by filling in or otherwise marking the corresponding empty circle. The user may use a pen, pencil, or other writing implement, for example. The marked-up hardcopy of the document is then scanned at the computing device 104 by the scanning device 110 (120), resulting in a scanned image of the (marked-up) document. That is, it can be said that the offers of interest to the user are scanned.

The scanned image of the document is sent from the computing device 104 over the network 106 to the computing device (102). In response, the computing device 102 sends coupons corresponding to the offers in which the user has an interest, to the computing device 104 over the network 106 (124). More specifically, the computing device 102 performs a recognition process of the scanned image of the marked-up hardcopy of the document, to discern which offers are of interest to the user, and then sends the corresponding coupons to the user. Hardcopies of the coupons can then be printed out at the computing device 104 by the printing device 108 (126), for redemption by the user at the businesses in question.

In one implementation, the coupons can be printed by the printing device 108 without any user interaction, such that the user is prevented from printing multiple copies of the same coupon. For example, the coupons may be sent directly to the printing device 108 for printing, bypassing the computing device 104. As another example, the computing device 104 may print the coupons using the printing device 108 without user interaction, in a manner that prohibits the user from accessing the coupons stored on the printing device 108 so that the user cannot print multiple copies of the coupons.

Of particular concern herein is the recognition process of the scanned image of the marked-up hardcopy of the document by the computing device 102. A novel recognition process has been developed that permits for the scanned image to be robustly, quickly, and accurately processed to discern the features that the user has marked. While this process is described herein in relation to offers and coupons, the process is more generally applicable to other documents that include features, which users may or may not mark.

Figure 2:
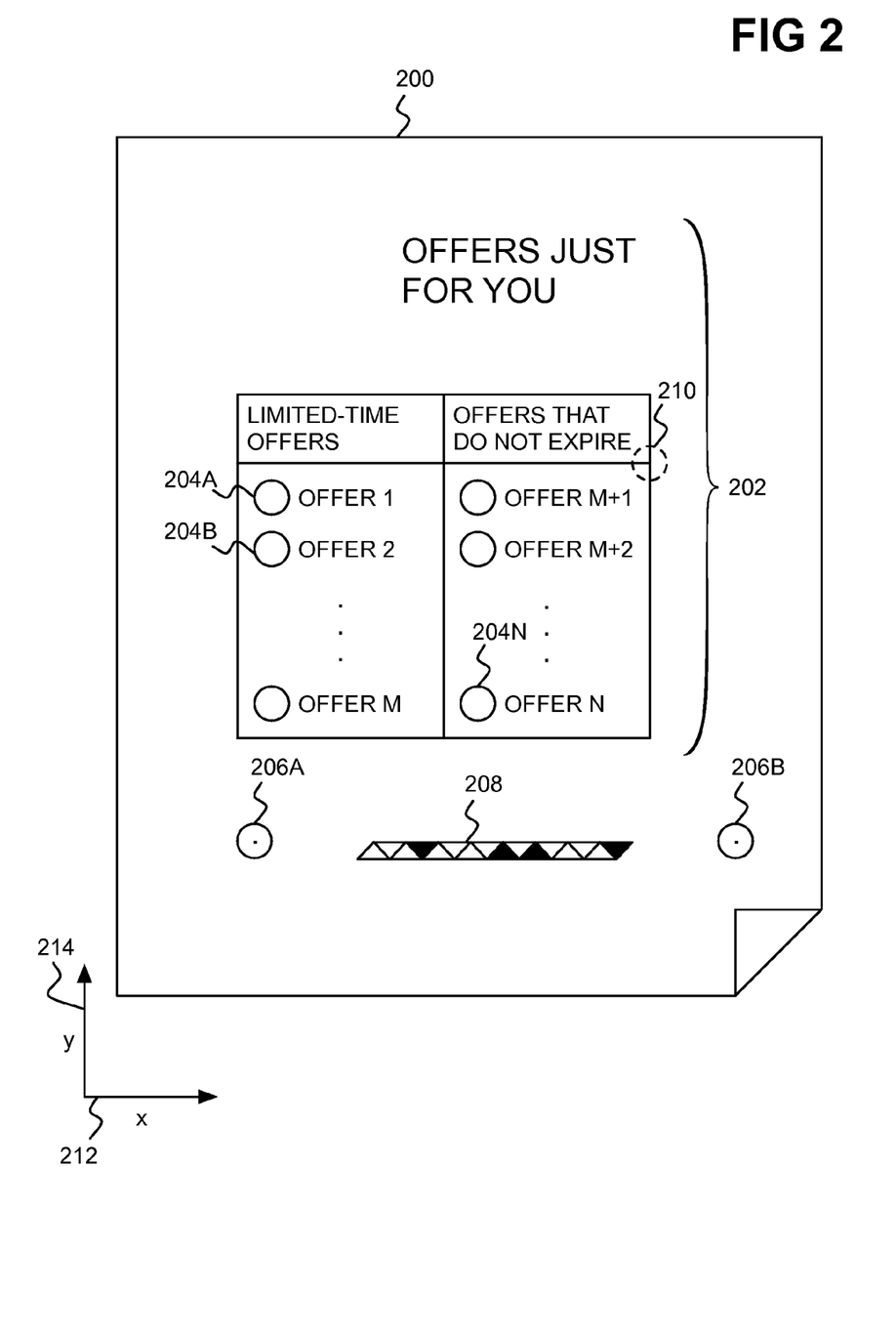
FIG. 2 is a diagram of an example document.

FIG. 2 shows an example document 200 that includes offers which are realized by coupons. The document 200 includes content 202. The content 202 relays information to a user. For instance, as depicted in FIG. 2, the content 202 can include a title like "offers just for you," and a number of offers organized in a first column listing limited-time offers and a second column listing offers that do not expire. There are features 204A, 204B, . . . , 204N, which are collectively referred the features 204, corresponding to the offers printed on the document 200. These features 204 may be hollow circles, for instance, that a user fills in or otherwise marks to indicate his or her interest in receiving coupons corresponding to the offers.

In addition to the content 202, the document 200 includes a pair of fiducial marks 206A and 206B, collectively referred as to the pair of fiducial marks 206, as well as a code mark 208. The fiducial marks 206 and the code mark 208 may be considered additional content besides the content 202. As such, there may be no content printed on the document 200 other than the content 202 that relays information to the user, the fiducial marks 206, and the code mark 208. That is, the entirety of the content that has been printed on the document 200 is represented by the content 202, the fiducial marks 206, and the code mark 208. Furthermore, there may be just two of the fiducial marks 206, which may be explicitly rotationally invariant in shape, such as circular in shape.

The fiducial marks 206 are located parallel to and near an edge of the document 200, such as within a bottom margin of a half inch, one inch, and so on, of the edge. More specifically, the fiducial mark 206A is located in one corner of the document and the fiducial mark 206B is located at another corner of the document. The fiducial marks 206 do not convey information to the user. Rather, the fiducial marks 206 are generally features that provide a point of reference or a measure, to assist determination of the locations of the features 204 on a scanned image of the document 200. The fiducial marks 206 may also be referred to as fiduciary marks, fiducial markers, or fiduciary markers, among other terminology.

The code mark 208 is located between and at least substantially collinear to the fiducial marks 206. The code mark 208 can also be used to assist determination of the locations of the features 204 on a scanned image of the document 200. As one example, an identifier of the document 200, which can include offers that are uniquely generated for a particular user, may be encoded into the code mark 208. The identifier in this respect functions as a reference mechanism by which metadata describing information regarding the document 200 can be looked up in a database. The identifier at least substantially uniquely identifies the document 200 as compared to other identifiers of other documents of a similar type.

Therefore, the code mark 208 can be recognized in a scanned image of the document 200 to determine the identifier, and on the basis thereof the locations of the features 204 within the document 200 can be determined, such as by looking up these locations as referenced by the identifier within a database. As another example, the location of the features 204 within the document 200 can itself be directly encoded within the code mark 208. This latter example is generally useful where the amount of data that is to be encoded directly within the code mark 208 is minimal in size.

In addition, another fiducial mark 210 can be part of the content 202 of the document 200. For instance, in the example of FIG. 2, the fiducial mark 210 is a T-like shape that has been rotated clockwise ninety degrees. The fiducial mark 210 is a part of the content 202 in this example in that the mark 210 is part of the box that surrounds both columns of offers and is part of the line that separates the column heading "offers that do not expire" from the offers in this column. The fiducial mark 210 differs from the fiducial marks 206 in that the mark 210 is part of the content 202 that relays information to the user, whereas the marks 206 are not. Other examples of such additional implicit fiducial marks 210 include horizontal line segments, vertical line segments, corner segments, and small circles that are part of the content 202.

It is noted that this additional fiducial mark 210 is not collinear with the pair of fiducial marks 206. For instance, an x-axis 212 and a y-axis 214 are depicted in FIG. 2. The x-axis 212 is more generally a first axis, and the y-axis 214 is more generally a second axis that is perpendicular to the first axis. By definition, the pair of fiducial marks 206 are located at the same position along the y-axis 214, such that the fiducial marks 206 are collinear along the x-axis 212. However, the additional fiducial mark 210 is located at a different position along the y-axis 214 as compared to the fiducial marks 206. Therefore, the fiducial mark 210 is not collinear with the pair of fiducial marks 206 along the x-axis 212.

Figure 3:
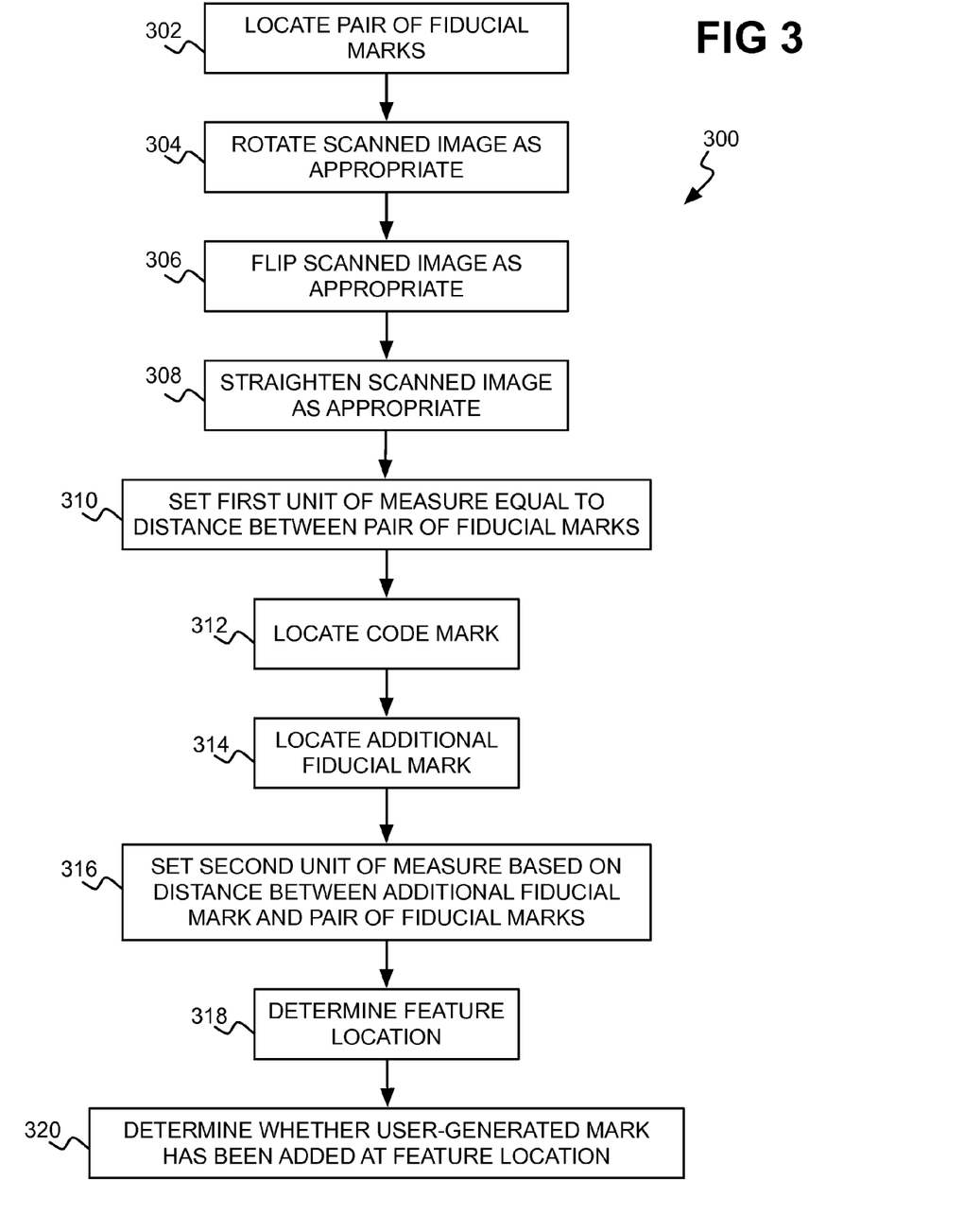
FIG. 3 is a flowchart of an example method to locate a feature on a scanned image of a document.

FIG. 3 shows an example method 300 by which a scanned image of a printed document like the example document 200 is processed to locate a feature on the scanned image of the document, such as any of the features 204 of the document 200. The method 300 may be implemented as a computer program stored on a non-transitory computer-readable data storage medium. Examples of such computer-readable data storage media include magnetic media, optical media, semiconductor media, volatile media, and/or non-volatile media, among other types of such media. Execution of the computer program by a processor of a computing device, such as the computing device 102, causes the method 300 to be performed. The method 300 is described in relation to the example document 200, but is more generally applicable to other documents as well.

The pair of fiducial marks 206 is located on the scanned image of the document 200 (302). For instance, it can be known that the fiducial marks 206 are located at corners of the document 200. Therefore, each corner, such as each corner defined by predetermined distances from two cornering edges of the document 200, is analyzed. The predetermined distances are large enough to compensate for any inexactness in the scanning process, such as minor rotation of the document 200 and over-scanning, as well as any inexactness in the printing process, such as the inability to print to the edge of a sheet of media like paper.

In one implementation, the analysis (i.e., recognition) process that is employed is a two-dimensional convolution kernel filter process. The kernel filter seed set for this process is set to the shape and size of the fiducial marks 206. The fiducial marks 206 can be circular in shape to be explicitly rotationally invariant. The size of the kernel filter seeds may be generated dynamically as a known fraction of the size of the originally generated fiducial marks 206 to the scanned page width, and then applying this ratio to the scanned page width to determine the size of the kernel filter seeds, which provides for resolution independence.

The fiducial marks 206 are originally generated along a known predetermined edge of the document 200, such as the bottom edge of the document 200. However, in generating the scanned image of the document 200, the printed document 200 may be placed in the scanning device so that the fiducial marks 206 are located along a different edge of the document 200. There are two general cases in this respect.

First, the printed document 200 may be scanned to generate the scanned image such that the fiducial marks 206 are located along an adjacent edge of the edge near which the fiducial marks 206 are expected. For instance, if the fiducial marks 206 are expected to be located on the bottom edge, they may instead be located on the left edge or the right edge. This results when the printed document 200 is placed in the scanning device, or is otherwise scanned by the scanning device, in landscape mode when the document is in fact in portrait mode, or vice-versa.

In this case, the scanned image is rotated so that the fiducial marks 206 are located near the expected edge of the scanned image (304). For instance, if the fiducial marks 206 are expected near the bottom edge of the scanned image, but have been located near the left edge of the scanned image, then the scanned image is rotated ninety-degrees counterclockwise. Likewise, if the fiducial marks 206 are expected near the bottom edge of the scanned image, but have been located near the right edge of the scanned image, then the scanned image is rotated ninety-degrees clockwise.

In this manner, the angle of the image with respect to the scan orientation can be determined. This angle can be used to rotate the page to ensure that the content of the image is right-side-up. Another way to compensate for such a non-zero angle is to generate a coordinate transformation matrix that is the inverse of this angle, and then apply any coordinates that describe page content so that just the feature locations are rotated, as opposed to each pixel of the image. Using a coordinate transformation matrix is less computationally intensive than rotating every pixel of the scanned image.

Figure 4A:
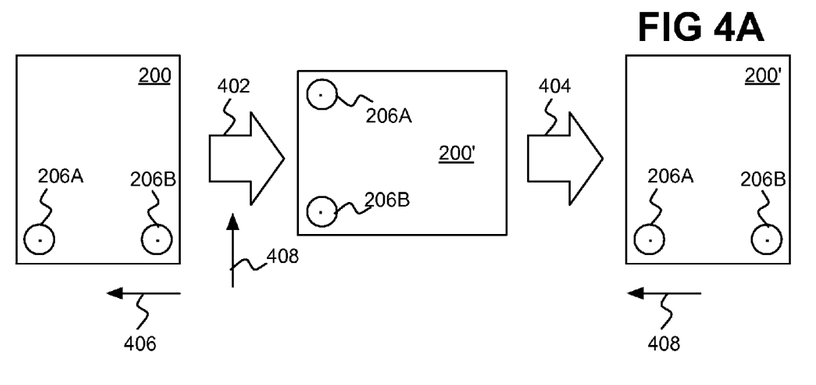
FIGS. 4A, 4B, and 4C are diagrams depicting example performance of various parts of the example method of FIG. 3.

FIG. 4A shows an example performance of part 304 of the method 300. The original document 200 includes the fiducial marks 206A and 206B, collectively referred to as the fiducial marks 206 as before. The fiducial marks 206 are located near an edge of the document 200 that is parallel to an axis 406 of the document 200. The document 200 is scanned by a scanning device, as represented by the arrow 402, to generate a scanned image 200' of the document 200.

Within the scanned image 200', the fiducial marks 206A and 206B are located near an edge of the image 200' that is parallel to an axis 408 of the scanned image. It is noted that the axis 408 is perpendicular to the axis 406 to which the edge of the document 200 near which the fiducial marks 206 are located on the document 200 itself. More generally, it is said that the axis 408 is more perpendicular than parallel to the axis 406. This is because if the document 200 was scanned in a slightly rotated manner to generate the scanned image 200', the axis 408 would not be perfectly perpendicular to the axis 406, but would still be more perpendicular than parallel to the axis 406.

Because the axis 408 is more perpendicular than parallel to the axis 406, the scanned image 200' is rotated so that the axis 408 is more parallel than perpendicular to the axis 406 and so that the edge of the scanned image 200' near which the fiducial marks 206 are located corresponds to the edge of the document 200 near which the marks 206 are located. This rotation is represented by the arrow 404 in FIG. 4A. The resulting rotated scanned image 200' includes the fiducial marks 206 on the bottom edge of the image 200', as in the original document 200. The axis 408 is now more parallel, if not perfectly parallel, than perpendicular to the axis 406.

It is noted that the amount of rotation to transform the at least substantially perpendicular scanned image 200' to the original rotation can be determined as follows in one implementation. The fiducial marks 206 are located, and the angle between a line between the fiducial marks 206A and an absolute horizontal line within the scanned image 200' is determined. This angle is the angle referred to above, such that each feature location—or each pixel of the scanned image 200' in one scenario—are rotated in accordance with this angle.

Referring back to FIG. 3, the other general case is that the printed document 200 may be scanned to generate the scanned image such that the fiducial marks 206 are located along the opposite edge of the edge near which the fiducial marks 206 are expected. For instance, if the fiducial marks 206 are expected to be located on the bottom edge, they may instead be located on the top edge. This results when the printed document 200 is placed in the scanning device upside-down instead of right-side-up. In this case, the scanned image is flipped so that the fiducial marks 206 are located near the expected edge of the scanned image (306).

Figure 4B:
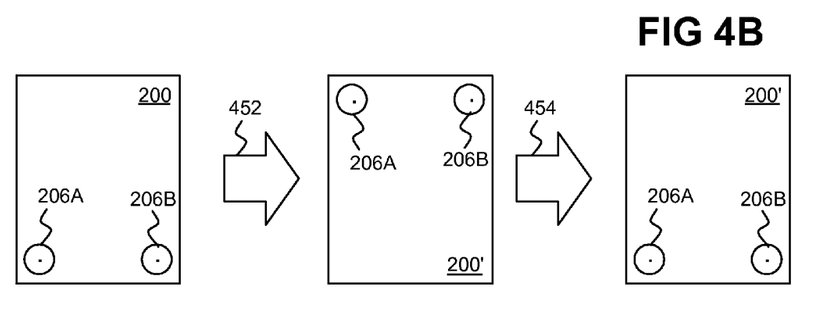

FIG. 4B shows an example performance of part 306 of the method 300. The original document 200 includes the fiducial marks 206A and 206B, collectively referred to as the fiducial marks 206 as before. The fiducial marks 206 are located near the bottom edge of the document 200. The document 200 is scanned by a scanning device, as represented by the arrow 452, to generate a scanned image 200' of the document 200.

Within the scanned image 200', the fiducial marks 206A and 206B are located near the top edge of the image 200' opposite the bottom edge of the document 200 near which the fiducial marks 206 are located within the document 200. More generally, it is said that the fiducial marks 206 are located near an edge of the image 200' that is opposite the edge of the document 200 near which the marks 206 are located within the document 200. Therefore, the scanned image 200' is flipped, as represented by the arrow 454, so that the fiducial marks 206 are located within the image 200' near the same edge near which the fiducial marks 206 are located within the original document 200.

Referring back to FIG. 3, the rotation of the scanned image in part 304, as appropriate, and the flipping of the scanned image in part 306, also as appropriate, ultimately permits the location of a feature 204 of the document 200 to be determined within the scanned image of the document 200, regardless of how the document 200 has been scanned. For instance, the document 200 may be scanned in portrait mode right-side-up, in portrait mode upside-down, in landscape mode right-side-up, or in landscape mode upside-down. Nevertheless, the scanned image of the document 200 can be rotated in part 304, and/or flipped in part 306, so that the fiducial marks 206 are located within the image near the same edge that the marks 206 are located within the original document 200 itself.

The document 200 also may be scanned in by the scanning device in a crooked manner, such that the fiducial marks 206 are not located parallel to the edge of the scanned image of the document 200 near which they are located. In this case, the scanned image is straightened as appropriate (308). That is, the scanned image is rotated so that the fiducial marks 206 are located along a collinear horizontal line.

Figure 4C:
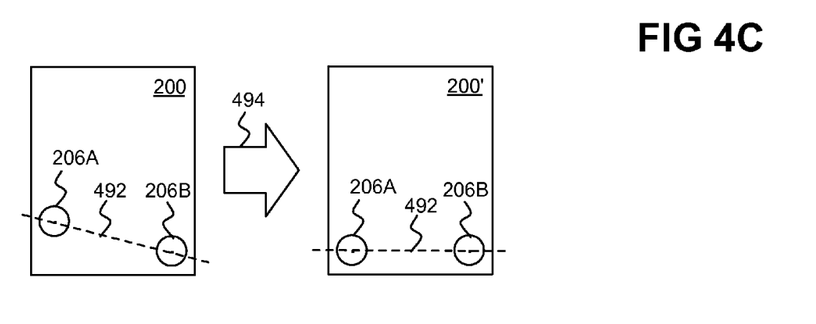

FIG. 4C shows an example performance of part 308 of the method 300. On the left-hand side of FIG. 4C, the fiducial marks 206A and 206B, collectively referred to as the fiducial marks 206 as before, are located within the scanned image 200' along an imaginary line 492 that is not parallel to the bottom edge of the image 200'. This is because the original document 200 was scanned in a crooked manner, resulting in a slightly crooked scanned image 200' (which is exaggerated in FIG. 4C for illustrative clarity).

Therefore, the scanned image 200' is rotated counter-clockwise, as represented by the arrow 494, so that the imaginary line 492 is parallel to the bottom edge of the scanned image 200', on the right-hand side of FIG. 4C. As such, the fiducial marks 206 are no longer not parallel to the bottom edge of the scanned image 200', but instead are indeed parallel to the bottom edge of the image 200'. The imaginary line 492 in FIG. 4C is not actually present within the scanned image 200', but is instead included in FIG. 4C to clearly illustrate that the fiducial marks 206 are not parallel to the bottom edge of the image 200' on the left-hand side of FIG. 4C, but are parallel to the bottom edge of the image 200' on the right-hand side.

Referring back to FIG. 3, the straightening of the scanned image in part 308, as appropriate, ultimately permits the location of a feature 204 of the document 200 to be determined within the scanned image of the document 200, regardless of whether the document 200 has been scanned in crooked when generating the scanned image. Parts 304, 306, and 308 of the method 300 are thus performed to compensate for incorrect scanning of the document 200 when generating the scanned image. After performance of parts 304, 306, and 308, the resulting scanned image includes the fiducial marks 206 located near and parallel to the same edge of the image as that near which the fiducial marks 206 are located within the original document 200.

A first unit of measure is set equal to (and more generally, based on) the distance between the pair of fiducial marks 206 within the scanned image (310). The first unit of measure is for the first axis 212 of the scanned image, particularly the axis to which the edge of the image near which the fiducial marks 206 are located is parallel. The scanned image has what is referred to herein as a first resolution along this axis 212. The first unit of measure is a distance in pixels, for instance, between the pair of fiducial marks 206 within the scanned image. For example, if the fiducial marks 206 are located seven inches apart from one another within the scanned image, and if the original document 200 was scanned in at a (first) resolution of 600 dots-per-inch (dpi) along the first axis 212, then the fiducial marks 206 are located 4,200 pixels apart from one another.

The first unit of measure permits the location of a feature 204 of the document 200 to be determined within the scanned image of the document 200, regardless of the first resolution at which the document 200 was scanned along the first axis 212 when generating the scanned image. For instance, the fiducial mark 206A may have a coordinate of zero along this first axis 212, and the fiducial mark 206B may have a coordinate of one along the first axis 212. The feature 204 may have its location specified along the first axis 212 by the coordinate of ¾. This coordinate can be converted to pixels by multiplying it by the first unit of measure, such as 4,300 pixels, to specify the location along the first axis 212 at which the feature 204 is located within the scanned image. In this example, the feature 204 is expected to be horizontally located along the first axis 212 at 4,300 times ¾, or 3,225, pixels away from the fiducial mark 206A.

In one implementation, the vertical location of the feature 204 within the scanned image is determined in a similar manner. For instance, the vertical location of the feature 204 may be specified as the distance in pixels away from a horizontal line between the fiducial marks 206, along the second axis 214. In this example, then, the first unit of measure is employed to locate both the horizontal location as well as the vertical location of the feature 204 within the scanned image.

The code mark 208 is located within the scanned image of the document 200 (312). The code mark 208 is known to be located between and at least substantially collinear with fiducial marks 206. Therefore, the region of the scanned image that is between the fiducial marks 206 is analyzed to locate the code mark. As part of locating the code mark 208 in part 312, the code mark 208 can be decoded. As noted above, the code mark 208 encodes information, such as a unique identifier of the document 200 that has been scanned to generate the scanned image. This unique identifier can then be looked up within a database to retrieve other information regarding the document 200 (and thus regarding the scanned image). As another example, this other information may itself be encoded within the code mark 208.

It is noted that the document 200 is typically scanned in at a resolution that is nominally the same along two axes. However, due to imperfections of scanning devices, in actuality the first resolution along the first axis 212 parallel that is parallel to the fiducial marks 206 may differ from a second resolution along the second axis 214 perpendicular to the first axis 212. For example, the first resolution may be exactly 600 dpi, whereas the second resolution may differ from the first resolution by a small percentage, such as between zero and one percent.

This situation can result due to the manner by which scanning devices generate scanned images. Consider a typical flatbed scanner, for instance. A flatbed scanner generally includes a transparent surface on which a document is placed for scanning. A scanning bar moves under the surface to scan the document on a line-by-line basis. The horizontal, or first, scanning axis 212 is represented by the bar itself. The scanning bar includes a number of scanning elements, or mechanisms, that are manufactured at a desired horizontal, or first, resolution, such as 600 dpi.

By comparison, the vertical, or second, scanning axis 214 is represented by the motion of the scanning bar underneath the document. The motor that moves the scanning bar along this axis 214 may be nominally set to provide for a second resolution that is equal to the first resolution of the bar itself. However, in practice, vagaries in the movement process can result in the second resolution of the vertical axis 214 being slightly unequal to the first resolution of the horizontal axis 212.

To compensate for this situation, an additional fiducial mark 210 may be located within the scanned image of the document 200, based on the code mark 208 that has been located within the scanned image (314). As noted above, the additional fiducial mark 210 can be a part of the content 202 of the document 200 that conveys information to the user. The expected location of the fiducial mark 210 may be encoded within the code mark 208, or may be looked up within a database based on a unique identifier encoded within the code mark 208.

The expected location of the fiducial mark 210 is provided as a multiple or a fraction of the coordinate system defined by the fiducial marks 206. The fiducial mark 206A may have coordinates of (0, 0), whereas the fiducial mark 206B may have coordinates of (1, 0). Because the first unit of measure has already been determined, the location of the additional fiducial mark 210 along the first (e.g., horizontal) axis 212 can be determined precisely. For instance, the coordinates of the additional fiducial mark 210 may be specified by coordinates of (¾, ⅝). Where the first unit of measure is 4,300 pixels, then it is known that the fiducial mark 210 is located 3,225 pixels away from the fiducial mark 206A along the first axis 212.

However, because the second resolution at which the document 200 is scanned along the second (e.g., vertical) axis 214 can vary somewhat from the first resolution, the location of the additional fiducial mark 210 along the second axis 214 cannot be precisely determined. Nevertheless, it is known that the second resolution is similar to the first resolution. Therefore, an initial specification of the location of the additional fiducial mark 210 can be determined by multiplying the coordinate of the fiducial mark 210 along the second axis 214 by the first unit of measure. In the example, it is thus expected that the additional fiducial mark 210 is located ⅝ times 4,300, or about 2,688, pixels away from the fiducial mark 206A along the second axis 214.

The scanned image of the document 200 can then be analyzed at a location 3,225 pixels away from the fiducial mark 206A along the first (e.g., horizontal) axis 212, and about 2,688 pixels away from the fiducial mark 206B along the second (e.g., vertical) axis 214 to locate the additional fiducial mark 210. The shape of the additional fiducial mark 210 is known, and desirably this shape is unique at least within the general vicinity of the location of the fiducial mark 210 within the scanned image, if not within the scanned image as a whole. As such, once the additional fiducial mark 210 has been located, its precise location away from the fiducial mark 206A along the second axis 214 becomes known.

A second unit of measure is then set based on the distance between the additional fiducial mark 210 and either or both of the fiducial marks 206 along the second axis 214 (316). Because the fiducial marks 206 are collinear along the first axis 212, the distance between the fiducial mark 210 and either fiducial mark 206 along the second axis 214 that is perpendicular to the first axis 212 is identical. The second unit of measure is similar to the first unit of measure, but is for the second axis 214 of the scanned image, which is particularly the axis 214 to which the edge of the scanned image near which the fiducial marks 206 are located is perpendicular.

As an example, the document 200 may have been scanned at an actual resolution of 600 dpi along the first axis 212, but at an actual resolution that slightly varies from 600 dpi along the second axis 214. The first unit of measure, for the first axis 212, is determined as 4,300 pixels, as above. The additional fiducial mark was initially assumed to be located at a distance of about 2,688 pixels away from the fiducial mark 206A along the second axis 214. However, upon inspection of the scanned image, it may be determined that the additional fiducial mark 210 is located 2,600 pixels away from the fiducial mark 206A along the second axis 214.

Because the additional fiducial mark 210 has a coordinate of ⅝ along the second axis 214, 2,600 is divided by ⅝ to result in a second unit of measure of 4,160 pixels for the second axis 214. This second unit of measure corresponds to a second resolution of about 594 dpi at which the document was scanned along the second axis 214. Therefore, by precisely locating the additional fiducial mark 210, variation between the first resolution at which the document 200 was scanned along the first (e.g., horizontal) axis 212 and the second resolution at which the document 200 was scanned along the second (e.g., vertical) axis 214 can be accommodated.

Determining a first unit of measure in part 310 ultimately permits the location of a feature 204 within the scanned image of the document 200 to be determined independent of the first resolution at which the document 200 is scanned along the first axis 212. Likewise, determining a second unit of measure in part 316 ultimately permits the location of this feature 204 within the scanned image to be determined independent of the second resolution at which the document 200 is scanned along the second axis 214 perpendicular to the first axis 212. Determining both a first unit of measure and a second unit of measure takes into account the situation, or scenario, in which the first resolution is different than the second resolution.

It is noted that parts 314 and 316 do not have to be performed if the first unit of measure is used to locate each feature 204 within the scanned image of the document 200 both horizontally along the first axis 212 and vertically along the second axis 214. In such an implementation, it is assumed that the vertical and horizontal scanning resolutions are at least substantially identical, or are sufficiently identical that the vertical resolution can be assumed to be equal to the horizontal resolution. In this case, there may be no additional fiducial mark 210, or the additional fiducial mark 210 is present, it is not located and not used.

Furthermore, in another implementation, there may be more than one additional fiducial mark 210. Having more than one additional fiducial mark 210 is useful to compensate for various less-than-ideal scanning situations. For example, skew and non-linear warp of the hardcopy of the document 200 as the hardcopy is being scanned, which may result from an automatic document feeder of the scanning device or mechanism not pulling or feeding the hardcopy in a straight manner, can be compensated for using more than one additional fiducial mark 210.

The location of each feature 204 within the scanned image of the document 200 can thus be determined (318). Each feature 204 has a location specified by the coordinate system in which (0, 0) is defined as the location of the fiducial mark 206A and (1, 0) is defined as the location of the fiducial mark 206B. The actual distance in pixels between the fiducial marks 206 within the scanned image along the first axis 212 is specified by the first unit of measure.

If the additional fiducial mark 210 is not located in part 314 and a second unit of measure is not set in part 316, then the distance between the location (1, 0) and the location of the fiducial mark 206A within the scanned image along the second axis 214 is presumed to be specified by the first unit of measure as well. By comparison, the additional fiducial mark 210 may be located in part 314 and a second unit of measure set in part 316. In this situation, the distance between the location (1, 0) and the location of the fiducial mark 206A within the scanned image along the second axis 214 is specified by the second unit of measure.

The location of each feature 204 within the coordinate system is looked up in a database based on the identifier encoded within the code mark 208, or is directly encoded within the code mark 208. The coordinates of a feature 204 are thus multiplied by the appropriate scaling values to locate the feature 204 within the scanned image of the document 204. For instance, if the distance between the fiducial mark 206A and each of the locations (1, 0) and (0, 1) is specified by the first unit of measure, then the coordinates of the feature 204 are each multiplied by the first unit of measure to determine the number of pixels the feature 204 is located away from the fiducial mark 206A along the axes 212 and 214 within the scanned image.

By comparison, if the distance between the fiducial mark 206A and the location (1, 0) is specified by the first unit of measure, and the distance between the fiducial mark 206B and the location (0, 1) is specified by the second unit of measure, then the feature 204 is located within the scanned image as follows. The distance in pixels that the feature 204 is located within the scanned image from the fiducial mark 206A along the first axis 212 is the first coordinate of the feature 204 multiplied by the first unit of measure. The distance in pixels that the feature 204 is located within the scanned image from the fiducial mark 206A along the second axis 214 is the second coordinate of the feature 204 multiplied by the second unit of measure.

For example, a feature 204 may have coordinates of (¼, ⅝). Therefore, the feature 204 is located ¼ times 3,400, or 1,075, pixels horizontally away from the fiducial mark 206A along the first axis 212 within the scanned image of the document 200. The feature 204 is further located ⅝ times 4,160, or about 3467, pixels away from the fiducial mark 206A along the second axis 214 within the scanned image of the document.

It is said that the location of a feature 204 within the scanned image is determined based on the fiducial marks 206 and the code mark 208 that have been located within (i.e., on) the scanned image of the document 200. This is because the fiducial marks 206 are located within the scanned image to provide the first unit of measure, and in order to locate the code mark 208 within the image. This is further because the code mark 208 is located within the scanned image to provide the location in coordinates of the feature 204 within the document 200 itself. Further, the location of a feature 204 within the scanned image may further be determined based on the additional fiducial mark 210 that has been located within the scanned image, because the fiducial mark 210 provides the second unit of measure.

Once a feature 204 has been precisely located, whether a user-generated mark has been added at this feature 204 can be determined (320). As noted above, for instance, each feature 204 may be a hollow circle. A user may fill in, or otherwise mark, a feature 204 to select the offer to which the feature 204 in question corresponds. By analyzing the scanned image at the actual location of the feature 204, as determined in part 318, whether the user has added a mark at this scanned image can be determined in part 320. For instance, if at least a threshold number of pixels located a predetermined radius of pixels around the location of the feature 204 are of value one (corresponding to black), then it may be determined that the user has added a mark at this feature 204.

The method 300 that has been described can be performed in relation to a scanned image of a document like the document 200, which is used in conjunction with a couponing system. The method 300 may further be performed in relation to a scanned image of a different type of a document, to at least locate features of the document within the scanned image. For instance, the method 300 may be performed in relation to a scanned image of a different type of document to also determine whether features of the document have had user-generated marks added to them.

Figure 5:
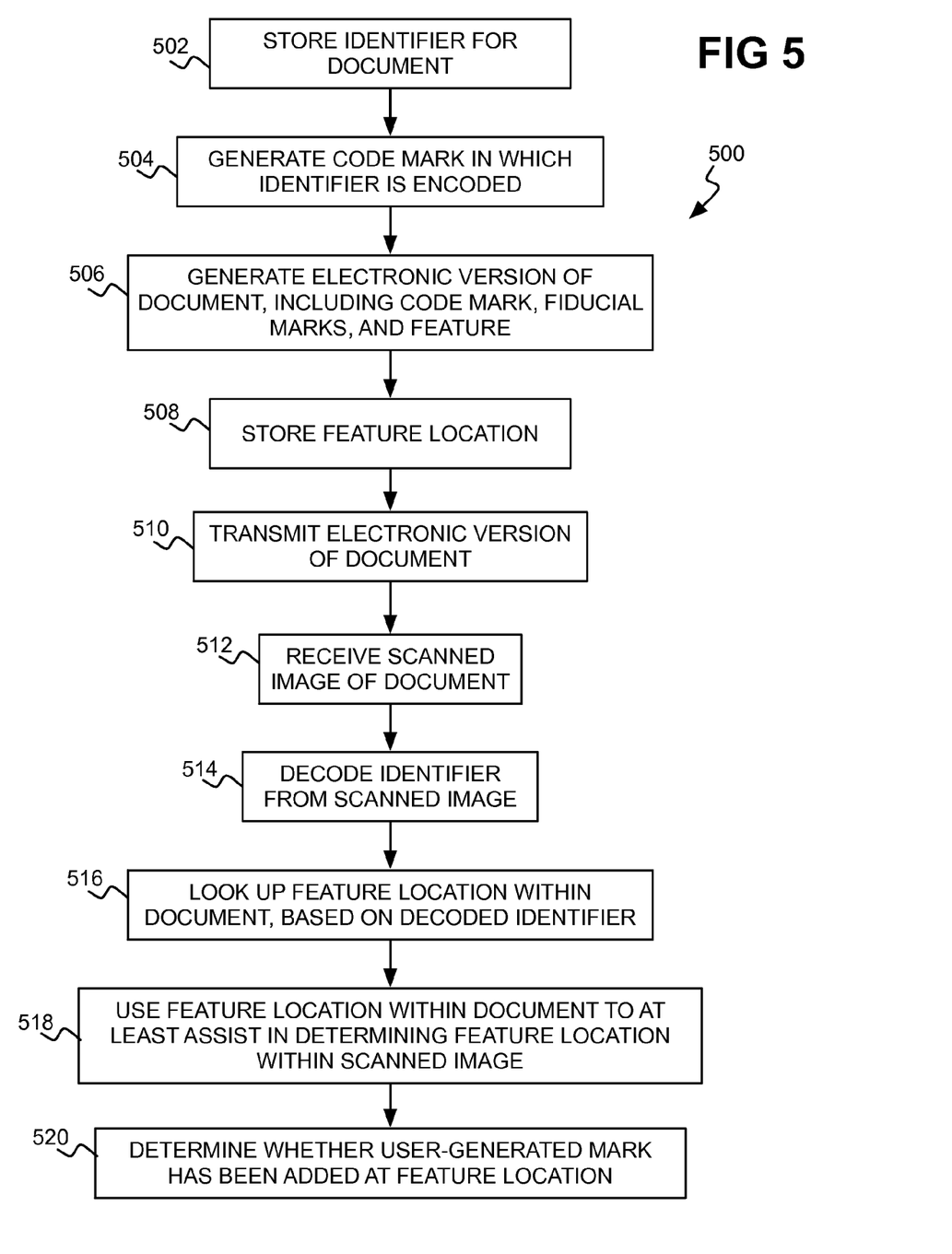
FIG. 5 is a flowchart of another example method that is consistent with the example method of FIG. 3.

FIG. 5 shows an example method 500 that is consistent with the method 300. The example method 500 is described in relation to the couponing system 100 and the document 200, but is more generally applicable to other types of systems and other types of documents as well. As with the method 300, the method 500 can be implemented as a computer program that is stored on a computer-readable data storage medium and that is executable by a processor of a computing device.

An identifier for a document is stored by the computing device 102 within a computer-readable data storage medium (502). For instance, the identifier may be stored within a database. The identifier at least substantially uniquely identifies the document as compared to other documents that may have been or may also be later generated.

A code mark is generated by the computing device 102 that encodes this identifier (504). An electronic version of the document is then generated by the computing device 102, where this electronic version of the document includes the code mark that has been generated, as well as fiducial marks and a feature (506). The location of the feature within the document is stored by the computing device 102 with the identifier within the computer-readable data storage medium (508), such as within a database.

The computing device 102 transmits the electronic version of the document to the computing device 104 over the network (510). As represented by the dotted arrow 511, the computing device 104 prints a hardcopy of the document using the printing device 108, and a user may add user-generated marks to this hardcopy. A scanned image of the document is then generated via the computing device 104 using the scanning device 104.

The computing device 104 sends the scanned image of the document over the network 106 to the computing device 102, which thus receives the scanned image (512). The computing device 102 decodes the identifier of the document from the scanned image (514). For instance, the computing device 102 may perform at least some parts of the method 300 so that the identifier can be located and decoded.

The computing device 102 looks up the location of the feature within the document, based on the identifier that has been decoded from the scanned image (516). For instance, the computing device 102 may look up the identifier within a computer-readable data storage medium to retrieve the feature location that has been stored with the identifier on this medium. The location of the feature within the document is used by the computing device 102 to at least assist in determining the location of the feature within the scanned image (518). For instance, the computing device 102 may perform at least some parts of the method 300 to locate the feature within the scanned image. Ultimately, then, the computing device 102 can determine whether a user-generated mark has been added at the location of the feature, as has been described in relation to part 320 of the method 300.

Figure 6:
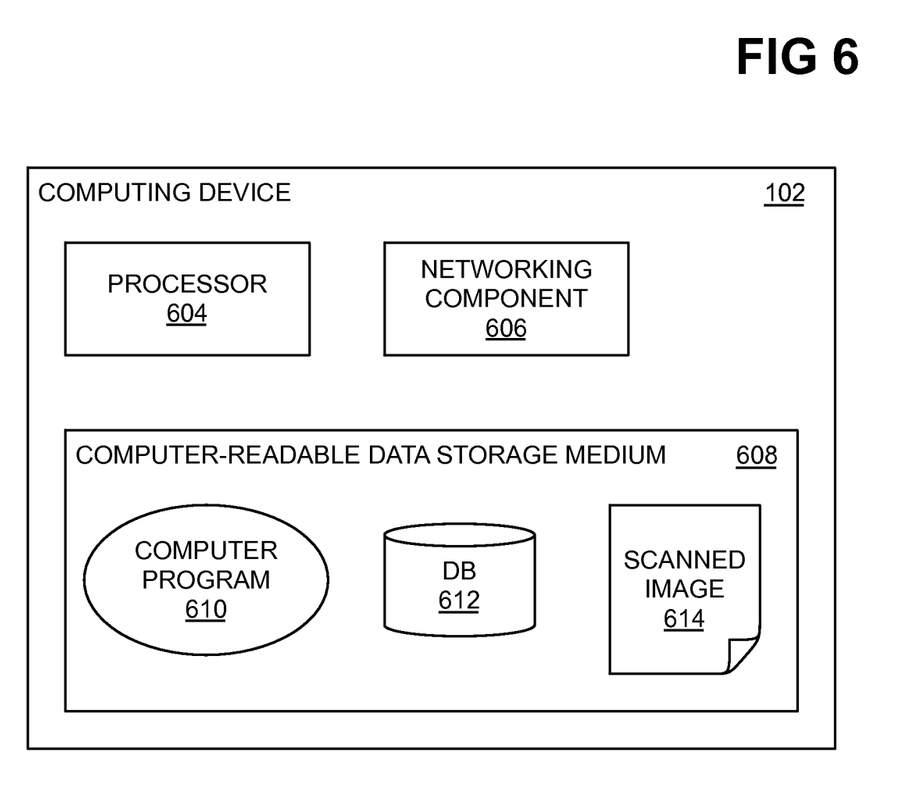
FIG. 6 is a diagram of an example computing device that can be used in the example system of FIG. 1.

FIG. 6 shows an example of the computing device 102 of the system 100 in detail. The computing device 102 is depicted as including a processor 604, a networking component 606, and a computer-readable data storage medium 608. The computing device 102 can include other components, however, in addition to and/or in lieu of the processor 604, the network component 606, and the computer-readable data storage medium 608. The networking component 606 permits the computing device 102 to communicate with the network 106, and thus with the computing device 104 over the network 106.

The computer-readable data storage medium 608 stores at least a computer program 610, a database 612, and a scanned image 614. The processor 604 is to execute the computer program 610 to perform the method 300 and/or the method 500 that have been described. The database 612 stores information, such as metadata, regarding a document by the identifier for the document. This information can include the location and description of an additional fiducial mark, as well as the location of each feature within the document. The scanned image 614 is the image of the document that is received from the computing device 104, and in relation to which the methods 300 and 500 are performed.

As has been noted above, the techniques disclosed herein can be applied to couponing systems, as well as other types of systems. Such other types of systems include travel-related systems, educational and learning-related systems, among other types of systems. As an example of application of the techniques disclosed herein to educational and learning-related systems, students may be asked to fill in hollow circles to answer questions, as well to fill in and/or create shapes in various colors. As to filling in hollow circles to answer questions, the techniques that have been described above in relation to determining whether a user has placed a mark in a particular feature can be employed.

As to filling in and/or creating colored shapes, the techniques that have been described above can be extended to provide for this functionality. For instance, the code mark that is located in part 312 of the method 300 of FIG. 3 can be looked up in a database to determine how large of an area is to be examined in relation to a particular feature location. Therefore, in part 320 of the method 300, not only can whether a user has marked the feature location in question be determined, but how the feature location has been filled in can be determined as well.

For example, the color, size, and/or shape that has been filled in within the area to be examined at a particular feature location can be determined. The color can be ascertained by determining the hue of the scanned image at this feature location, where the scanned image is itself in color. The size can be ascertained by determining the number of pixels within the area in question that have been marked, either as an absolute number or as a percentage of the total pictures within the area. The shape can be ascertained by comparing the pixels within the area in question that have been filled in to a number of known shapes, and by outputting the known shape that most closely matches the pixels that have been filled in within this area.

We claim:

1. A method comprising:
   performing, by a computer:
   locating first fiducial marks within a scanned image of a document on which the first fiducial marks have been printed;
   locating a code mark within the scanned image of the document on which the code mark has been printed, the code mark between the first fiducial marks, a provided location of a feature within the document being directly encoded within the code mark;
   locating, based on the code mark, a second fiducial mark other than the first fiducial marks;
   setting a first unit of measure for a first axis of the scanned image based on a distance in pixels along the first axis between the first fiducial marks;
   setting a second unit of measure for a second axis based on a distance in pixels along the second axis between the second fiducial mark and the first fiducial marks; and
   determining an actual location of the feature within the scanned image of the document other than the first fiducial marks, the second fiducial mark, and the code mark, based on the provided location of the feature within the document as encoded by the code mark, and based on the first unit of measure and the second unit of measure, wherein determining the actual location of the feature based on the provided location of the feature and on the first and second units of measure is performed independent of different resolutions of scanning the document along the respective first and second axes.

2. The method of claim 1, wherein the first fiducial marks have been printed on the document near an edge of the document that is parallel to a given axis of the document, the method further comprising:
   detecting that the first fiducial marks are along a particular edge of the scanned image;
   in response to detecting that the particular edge is not parallel to the given axis of the document, rotating the scanned image, by the computer, so that the particular edge of the scanned image is parallel to the given axis of the document; and
   in response to detecting that the particular edge is at a location that is opposite an edge of the document along which the first fiducial marks have been printed, flipping the scanned image, by the computer.

3. The method of claim 1,
   wherein the first fiducial marks are collinear along the first axis, and wherein the second fiducial mark is spaced apart from the first fiducial marks along the second axis.

4. The method of claim 3, wherein the document includes content printed on the document for relaying information to a user, where the first fiducial marks and the code mark are not part of the content, but the second fiducial mark is part of the content.

5. The method of claim 4, wherein the content printed on the document for relaying information to the user is first content printed on the document,
   wherein the first fiducial marks and the code mark are second content printed on the document,
   wherein the first content and the second content encompass an entire content that has been printed on the document,
   and wherein the second content includes only the first fiducial marks and the code mark.

6. The method of claim 1, further comprising determining, by the computer, whether a user-generated mark has been added to the document at the location of the feature within the scanned image.

7. The method of claim 6, wherein determining whether the user-generated mark has been added to the document at the location of the feature within the scanned image comprises determining one or more of a color, a size, and a shape that has been filled in at the location of the feature within the scanned image.

8. The method of claim 1, wherein the code mark within the scanned image of the document is substantially collinear between the first fiducial marks.

9. The method of claim 1, wherein the provided location of the feature is expressed as a multiple or fraction of a coordinate system defined by the first fiducial marks.

10. The method of claim 1, wherein the actual location comprises a first coordinate along the first axis and a second coordinate along the second axis, and wherein determining the actual location comprises:
    calculating the first coordinate based on the provided location and the first unit of measure; and
    calculating the second coordinate based on the provided location and the second unit of measure.

11. The method of claim 10, wherein calculating the first coordinate comprises multiplying a first coordinate of the provided location with the first unit of measure, and wherein calculating the second coordinate comprises multiplying a second coordinate of the provided location with the second unit of measure.

12. A system comprising:
a computer-readable storage medium to store a scanned image of a document on which first fiducial marks and a code mark between the first fiducial marks have been printed, a provided location of a feature within the document being directly encoded within the code mark; and
at least one processor to execute a computer program to:
  locate the first fiducial marks within the scanned image of the document;
  locate the code mark within the scanned image of the document;
  locate, based on the code mark, a second fiducial mark other than the first fiducial marks;
  set a first unit of measure for a first axis of the scanned image based on a distance in pixels along the first axis between the first fiducial marks;
  set a second unit of measure for a second axis based on a distance in pixels along the second axis between the second fiducial mark and the first fiducial marks; and
  determine an actual location of the feature within the scanned image of the document other than the first fiducial marks, the second fiducial mark, and the code mark, based on the provided location of the feature within the document as encoded by the code mark, and based on the first unit of measure and the second unit of measure, wherein determining the actual location of the feature based on the provided location of the feature and on the first and second units of measure is performed independent of different resolutions of scanning the document along the respective first and second axes.

13. The system of claim 12, wherein the at least one processor is further to determine whether a user-generated mark has been added to the document at the location of the feature within the scanned image.

14. The system of claim 12, wherein the provided location of the feature is expressed as a multiple or fraction of a coordinate system defined by the first fiducial marks.

15. The system of claim 12, wherein the actual location comprises a first coordinate along the first axis and a second coordinate along the second axis, and wherein the determining of the actual location comprises:
  calculating the first coordinate based on a first coordinate of the provided location and the first unit of measure; and
  calculating the second coordinate based on a second coordinate of the provided location and the second unit of measure.

16. A non-transitory computer-readable storage medium to store a computer program that when executed cause a computer to:
  locate first fiducial marks within a scanned image of a document on which the first fiducial marks have been printed;
  locate a code mark within the scanned image of the document on which the code mark has been printed, the code mark between the first fiducial marks, a provided location of a feature within the document being directly encoded within the code mark;
  locate, based on the code mark, a second fiducial mark other than the first fiducial marks;
  set a first unit of measure for a first axis of the scanned image based on a distance in pixels along the first axis between the first fiducial marks;
  set a second unit of measure for a second axis based on a distance in pixels along the second axis between the second fiducial mark and the first fiducial marks; and
  determining an actual location of the feature within the scanned image of the document other than the first fiducial marks, the second fiducial mark, and the code mark, based on the provided location of the feature within the document as encoded by the code mark, and based on the first unit of measure and the second unit of measure, wherein determining the actual location of the feature based on the provided location of the feature and on the first and second units of measure is performed independent of different resolutions of scanning the document along the respective first and second axes.

17. The non-transitory computer-readable storage medium of claim 16, wherein the document is related to one of a travel-related application and an educational or a learning-related application.

* * * * *